US 9,576,140 B1

(12) United States Patent
Ghostine et al.

(10) Patent No.: US 9,576,140 B1
(45) Date of Patent: Feb. 21, 2017

(54) SINGLE SIGN-ON SYSTEM FOR SHARED RESOURCE ENVIRONMENTS

(75) Inventors: Peter E. Ghostine, Vienna, VA (US); Michael McDonald, Herndon, VA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/594,273

(22) Filed: Aug. 24, 2012

Related U.S. Application Data

(63) Continuation of application No. 12/829,239, filed on Jul. 1, 2010, now Pat. No. 8,255,984.

(60) Provisional application No. 61/222,446, filed on Jul. 1, 2009.

(51) Int. Cl.
*G06F 7/04* (2006.01)
*G06F 21/62* (2013.01)
*H04L 29/06* (2006.01)

(52) U.S. Cl.
CPC ........... *G06F 21/62* (2013.01); *H04L 63/1416* (2013.01); *H04L 63/1441* (2013.01); *H04L 63/1491* (2013.01); *H04L 63/30* (2013.01)

(58) Field of Classification Search
CPC .......... G06F 21/30; G06F 21/62; H04L 63/08; H04L 63/10; H04L 63/1416; H04L 63/1441; H04L 63/30
USPC ............................... 726/8; 713/168; 709/217
See application file for complete search history.

(56) References Cited

U.S. PATENT DOCUMENTS

| | | | |
|---|---|---|---|
| 4,109,237 A | 8/1978 | Hill | |
| 4,370,707 A | 1/1983 | Phillips et al. | |
| 4,694,397 A | 9/1987 | Grant | |
| 5,222,018 A | 6/1993 | Sharpe et al. | |
| 5,267,865 A | 12/1993 | Lee et al. | |
| 5,302,132 A | 4/1994 | Corder | |
| 5,310,349 A | 5/1994 | Daniels et al. | |
| 5,313,465 A | 5/1994 | Perlman et al. | |
| 5,333,302 A | 7/1994 | Hensley et al. | |
| 5,339,435 A | 8/1994 | Lubkin et al. | |

(Continued)

FOREIGN PATENT DOCUMENTS

| | | |
|---|---|---|
| EP | 05728119.1 | 3/2005 |
| EP | 1 932 279 A2 | 6/2008 |

(Continued)

OTHER PUBLICATIONS

U.S. Appl. No. 12/200,814, filed Aug. 28, 2008, Eyes et al.

(Continued)

*Primary Examiner* — Techane Gergiso
(74) *Attorney, Agent, or Firm* — Winstead PC

(57) ABSTRACT

Systems and methods for enhancing security of single sign-on are described. These systems and methods can reduce the amount of sensitive information stored on a client device while still providing single sign-on access to shared resources such as virtual desktops or Terminal Servers. For example, storage of authentication information on client devices can be avoided while still allowing client devices to connect to the shared resources. Instead, such information can be stored at a broker server that brokers connections from client devices to the shared resources. The broker server can facilitate more secure single sign-on by providing a single-use ticket to a client device that authenticates with the broker server. The client device can use this single-use ticket to authenticate with a shared resource.

13 Claims, 6 Drawing Sheets

(56) References Cited

U.S. PATENT DOCUMENTS

| | | |
|---|---|---|
| 5,367,698 A | 11/1994 | Webber et al. |
| 5,371,852 A | 12/1994 | Attanasio et al. |
| 5,387,104 A | 2/1995 | Corder |
| 5,410,703 A | 4/1995 | Nilsson et al. |
| 5,423,032 A | 6/1995 | Byrd et al. |
| 5,437,027 A | 7/1995 | Bannon et al. |
| 5,437,555 A | 8/1995 | Ziv-el |
| 5,440,719 A | 8/1995 | Hanes et al. |
| 5,441,415 A | 8/1995 | Lee et al. |
| 5,497,486 A | 3/1996 | Stolfo et al. |
| 5,497,492 A | 3/1996 | Zbikowski et al. |
| 5,499,379 A | 3/1996 | Tanaka et al. |
| 5,530,829 A | 6/1996 | Beardsley et al. |
| 5,550,968 A | 8/1996 | Miller et al. |
| 5,550,976 A | 8/1996 | Henderson et al. |
| 5,553,291 A | 9/1996 | Tanaka et al. |
| 5,586,304 A | 12/1996 | Stupek, Jr. et al. |
| 5,590,360 A | 12/1996 | Edwards |
| 5,600,833 A | 2/1997 | Senn et al. |
| 5,608,874 A | 3/1997 | Ogawa et al. |
| 5,608,903 A | 3/1997 | Prasad et al. |
| 5,613,090 A | 3/1997 | Willems |
| 5,623,601 A | 4/1997 | Vu |
| 5,630,069 A | 5/1997 | Flores et al. |
| 5,630,131 A | 5/1997 | Palevich et al. |
| 5,659,735 A | 8/1997 | Parrish et al. |
| 5,659,736 A | 8/1997 | Hasegawa et al. |
| 5,666,502 A | 9/1997 | Capps et al. |
| 5,671,428 A | 9/1997 | Muranaga et al. |
| 5,673,386 A | 9/1997 | Batra |
| 5,673,387 A | 9/1997 | Chen et al. |
| 5,675,782 A | 10/1997 | Montague et al. |
| 5,677,997 A | 10/1997 | Talatik |
| 5,680,586 A | 10/1997 | Elkins et al. |
| 5,684,950 A | 11/1997 | Dare et al. |
| 5,692,132 A | 11/1997 | Hogan |
| 5,692,902 A | 12/1997 | Aeby |
| 5,694,540 A | 12/1997 | Humelsine et al. |
| 5,706,502 A | 1/1998 | Foley et al. |
| 5,708,812 A | 1/1998 | Van Dyke et al. |
| 5,708,828 A | 1/1998 | Coleman |
| 5,710,884 A | 1/1998 | Dedrick |
| 5,711,671 A | 1/1998 | Geeslin et al. |
| 5,724,521 A | 3/1998 | Dedrick |
| 5,727,145 A | 3/1998 | Nessett et al. |
| 5,727,951 A | 3/1998 | Ho et al. |
| 5,740,427 A | 4/1998 | Stoller et al. |
| 5,743,746 A | 4/1998 | Ho et al. |
| 5,745,113 A | 4/1998 | Jordan et al. |
| 5,745,902 A | 4/1998 | Miller et al. |
| 5,752,042 A | 5/1998 | Cole et al. |
| 5,754,173 A | 5/1998 | Hiura et al. |
| 5,754,938 A | 5/1998 | Herz et al. |
| 5,758,062 A | 5/1998 | Mcmahon et al. |
| 5,758,074 A | 5/1998 | Marlin et al. |
| 5,758,344 A | 5/1998 | Prasad et al. |
| 5,764,897 A | 6/1998 | Khalidi |
| 5,765,140 A | 6/1998 | Knudson et al. |
| 5,768,519 A | 6/1998 | Swift et al. |
| 5,774,551 A | 6/1998 | Wu et al. |
| 5,778,169 A | 7/1998 | Reinhardt |
| 5,784,553 A | 7/1998 | Kolawa et al. |
| 5,784,643 A | 7/1998 | Shields |
| 5,790,801 A | 8/1998 | Funato |
| 5,796,393 A | 8/1998 | Macnaughton et al. |
| 5,806,075 A | 9/1998 | Jain et al. |
| 5,812,669 A | 9/1998 | Jenkins et al. |
| 5,812,865 A | 9/1998 | Theimer et al. |
| 5,815,657 A | 9/1998 | Williams et al. |
| 5,815,665 A * | 9/1998 | Teper et al. ............ 709/229 |
| 5,819,265 A | 10/1998 | Ravin et al. |
| 5,819,281 A | 10/1998 | Cummins |
| 5,819,295 A | 10/1998 | Nakagawa et al. |
| 5,822,518 A | 10/1998 | Ooki et al. |
| 5,835,087 A | 11/1998 | Herz et al. |
| 5,835,911 A | 11/1998 | Nakagawa et al. |
| 5,838,918 A | 11/1998 | Prager et al. |
| 5,844,508 A | 12/1998 | Murashita et al. |
| 5,848,396 A | 12/1998 | Gerace |
| 5,859,972 A | 1/1999 | Subramaniam et al. |
| 5,872,928 A | 2/1999 | Lewis et al. |
| 5,872,973 A | 2/1999 | Mitchell et al. |
| 5,878,432 A | 3/1999 | Misheski et al. |
| 5,889,520 A | 3/1999 | Glaser |
| 5,890,161 A | 3/1999 | Helland et al. |
| 5,890,175 A | 3/1999 | Wong et al. |
| 5,892,898 A | 4/1999 | Fujii et al. |
| 5,893,074 A | 4/1999 | Hughes et al. |
| 5,893,076 A | 4/1999 | Hafner et al. |
| 5,893,916 A | 4/1999 | Dooley |
| 5,930,512 A | 7/1999 | Boden et al. |
| 5,937,165 A | 8/1999 | Schwaller et al. |
| 5,948,064 A | 9/1999 | Bertram et al. |
| 5,949,419 A | 9/1999 | Domine et al. |
| 5,956,732 A | 9/1999 | Tsuchida |
| 5,956,736 A | 9/1999 | Hanson et al. |
| 5,960,200 A | 9/1999 | Eager et al. |
| 5,968,176 A | 10/1999 | Nessett et al. |
| 5,987,247 A | 11/1999 | Lau |
| 5,995,114 A | 11/1999 | Wegman et al. |
| 6,002,868 A | 12/1999 | Jenkins et al. |
| 6,003,047 A | 12/1999 | Osmond et al. |
| 6,014,669 A | 1/2000 | Slaughter et al. |
| 6,014,712 A | 1/2000 | Islam et al. |
| 6,016,495 A | 1/2000 | Mckeehan et al. |
| 6,016,501 A | 1/2000 | Martin et al. |
| 6,021,496 A | 2/2000 | Dutcher et al. |
| 6,029,178 A | 2/2000 | Martin et al. |
| 6,029,195 A | 2/2000 | Herz |
| 6,029,247 A | 2/2000 | Ferguson |
| 6,035,323 A | 3/2000 | Narayen et al. |
| 6,041,344 A | 3/2000 | Bodamer et al. |
| 6,044,368 A | 3/2000 | Powers |
| 6,044,465 A | 3/2000 | Dutcher et al. |
| 6,049,822 A | 4/2000 | Mittal |
| 6,052,512 A | 4/2000 | Peterson et al. |
| 6,055,538 A | 4/2000 | Kessenich et al. |
| 6,058,260 A | 5/2000 | Brockel et al. |
| 6,058,379 A | 5/2000 | Odom et al. |
| 6,061,643 A | 5/2000 | Walker et al. |
| 6,061,650 A | 5/2000 | Malking et al. |
| 6,067,568 A | 5/2000 | Li et al. |
| 6,070,184 A | 5/2000 | Blount et al. |
| 6,076,166 A | 6/2000 | Moshfeghi et al. |
| 6,079,020 A | 6/2000 | Liu |
| 6,092,199 A | 7/2000 | Dutcher et al. |
| 6,101,481 A | 8/2000 | Miller |
| 6,101,503 A | 8/2000 | Cooper et al. |
| 6,108,649 A | 8/2000 | Young et al. |
| 6,108,670 A | 8/2000 | Weida et al. |
| 6,112,228 A | 8/2000 | Earl et al. |
| 6,112,240 A | 8/2000 | Pogue et al. |
| 6,115,040 A | 9/2000 | Bladow et al. |
| 6,115,544 A | 9/2000 | Mueller |
| 6,134,548 A | 10/2000 | Gottsman et al. |
| 6,137,869 A | 10/2000 | Voit et al. |
| 6,138,086 A | 10/2000 | Rose et al. |
| 6,141,006 A | 10/2000 | Knowlton et al. |
| 6,141,010 A | 10/2000 | Hoyle |
| 6,141,647 A | 10/2000 | Meijer et al. |
| 6,151,600 A | 11/2000 | Dedrick |
| 6,151,610 A | 11/2000 | Senn et al. |
| 6,161,176 A | 12/2000 | Hunter et al. |
| 6,167,445 A | 12/2000 | Gai et al. |
| 6,167,564 A | 12/2000 | Fontana et al. |
| 6,170,009 B1 | 1/2001 | Mandal et al. |
| 6,182,212 B1 | 1/2001 | Atkins et al. |
| 6,182,226 B1 | 1/2001 | Reid et al. |
| 6,185,625 B1 | 2/2001 | Tso et al. |
| 6,195,794 B1 | 2/2001 | Buxton |
| 6,199,068 B1 | 3/2001 | Carpenter |
| 6,199,079 B1 | 3/2001 | Gupta et al. |
| 6,202,051 B1 | 3/2001 | Woolston |
| 6,205,480 B1 | 3/2001 | Broadhurst et al. |

(56) References Cited

U.S. PATENT DOCUMENTS

| | | | |
|---|---|---|---|
| 6,208,345 B1 | 3/2001 | Sheard et al. |
| 6,209,000 B1 | 3/2001 | Klein et al. |
| 6,209,033 B1 | 3/2001 | Datta et al. |
| 6,222,535 B1 | 4/2001 | Hurd, II |
| 6,223,221 B1 | 4/2001 | Kunz |
| 6,226,649 B1 | 5/2001 | Bodamer et al. |
| 6,230,160 B1 | 5/2001 | Chan et al. |
| 6,230,194 B1 | 5/2001 | Chen et al. |
| 6,230,309 B1 | 5/2001 | Turner et al. |
| 6,233,584 B1 | 5/2001 | Purcell |
| 6,237,114 B1 | 5/2001 | Wookey et al. |
| 6,246,410 B1 | 6/2001 | Bergeron et al. |
| 6,249,905 B1 | 6/2001 | Yoshida et al. |
| 6,256,637 B1 | 7/2001 | Venkatesh et al. |
| 6,256,659 B1 | 7/2001 | Mclain, Jr. et al. |
| 6,256,678 B1 | 7/2001 | Traughber et al. |
| 6,260,068 B1 | 7/2001 | Zalewski et al. |
| 6,263,352 B1 | 7/2001 | Cohen |
| 6,266,666 B1 | 7/2001 | Ireland et al. |
| 6,269,405 B1 | 7/2001 | Dutcher et al. |
| 6,269,406 B1 | 7/2001 | Dutcher et al. |
| 6,272,673 B1 | 8/2001 | Dale et al. |
| 6,272,678 B1 | 8/2001 | Imachi et al. |
| 6,279,030 B1 | 8/2001 | Britton et al. |
| 6,282,576 B1 | 8/2001 | Lane |
| 6,282,605 B1 | 8/2001 | Moore |
| 6,286,028 B1 | 9/2001 | Cohen et al. |
| 6,286,104 B1 | 9/2001 | Buhle et al. |
| 6,301,601 B1 | 10/2001 | Helland et al. |
| 6,304,893 B1 | 10/2001 | Gish |
| 6,308,164 B1 | 10/2001 | Nummelin et al. |
| 6,308,188 B1 | 10/2001 | Bernardo et al. |
| 6,308,273 B1 | 10/2001 | Goertzel et al. |
| 6,313,835 B1 | 11/2001 | Gever et al. |
| 6,314,434 B1 | 11/2001 | Shigemi et al. |
| 6,327,677 B1 | 12/2001 | Garg et al. |
| 6,330,566 B1 | 12/2001 | Durham |
| 6,336,118 B1 | 1/2002 | Hammond |
| 6,341,287 B1 | 1/2002 | Sziklai et al. |
| 6,345,239 B1 | 2/2002 | Bowman-amuah |
| 6,349,287 B1 | 2/2002 | Hayashi |
| 6,363,398 B1 | 3/2002 | Andersen |
| 6,370,573 B1 | 4/2002 | Bowman Amuah |
| 6,370,646 B1 | 4/2002 | Goodman et al. |
| 6,381,579 B1 | 4/2002 | Gervais et al. |
| 6,389,589 B1 | 5/2002 | Mishra et al. |
| 6,401,085 B1 | 6/2002 | Gershman et al. |
| 6,401,211 B1 | 6/2002 | Brezak et al. |
| 6,405,364 B1 | 6/2002 | Bowman-amuah |
| 6,430,556 B1 | 8/2002 | Goldberg et al. |
| 6,438,514 B1 | 8/2002 | Hill et al. |
| 6,442,620 B1 | 8/2002 | Thatte et al. |
| 6,446,096 B1 | 9/2002 | Holland et al. |
| 6,453,317 B1 | 9/2002 | Lacost et al. |
| 6,457,130 B2 | 9/2002 | Hitz et al. |
| 6,466,932 B1 | 10/2002 | Dennis et al. |
| 6,469,713 B2 | 10/2002 | Hetherington et al. |
| 6,473,794 B1 | 10/2002 | Guheen et al. |
| 6,496,847 B1 | 12/2002 | Bugnion et al. |
| 6,567,818 B1 | 5/2003 | Frey et al. |
| 6,587,876 B1 | 7/2003 | Mahon et al. |
| 6,606,663 B1 * | 8/2003 | Liao et al. ............. 709/229 |
| 6,615,258 B1 | 9/2003 | Barry et al. |
| 6,625,622 B1 | 9/2003 | Henrickson et al. |
| 6,658,625 B1 | 12/2003 | Allen |
| 6,678,714 B1 | 1/2004 | Olapurath et al. |
| 6,715,128 B1 | 3/2004 | Hirashima et al. |
| 6,728,877 B2 | 4/2004 | Mackin et al. |
| 6,735,691 B1 | 5/2004 | Capps et al. |
| 6,757,696 B2 | 6/2004 | Multer et al. |
| 6,760,761 B1 | 7/2004 | Sciacca |
| 6,795,835 B2 | 9/2004 | Ricart et al. |
| 6,801,946 B1 | 10/2004 | Child et al. |
| 6,817,017 B2 | 11/2004 | Goodman |
| 6,839,766 B1 | 1/2005 | Parnafes et al. |
| 6,880,005 B1 | 4/2005 | Bell et al. |
| 6,925,477 B1 | 8/2005 | Champagne et al. |
| 6,938,158 B2 | 8/2005 | Azuma |
| 6,941,465 B1 | 9/2005 | Palekar et al. |
| 6,944,183 B1 | 9/2005 | Iyer et al. |
| 6,950,818 B2 | 9/2005 | Dennis et al. |
| 6,950,935 B1 | 9/2005 | Allavarpu et al. |
| 6,968,370 B2 | 11/2005 | Wu |
| 6,973,488 B1 | 12/2005 | Yavatkar et al. |
| 6,976,090 B2 | 12/2005 | Ben-Shaul et al. |
| 7,028,079 B2 | 4/2006 | Mastrianni et al. |
| 7,062,781 B2 | 6/2006 | Shambroom |
| 7,080,077 B2 | 7/2006 | Ramamurthy et al. |
| 7,089,584 B1 | 8/2006 | Sharma |
| 7,100,195 B1 | 8/2006 | Underwood |
| 7,117,486 B2 | 10/2006 | Wong et al. |
| 7,133,984 B1 | 11/2006 | Dickensheets |
| 7,136,927 B2 * | 11/2006 | Traversat et al. ............. 709/230 |
| 7,139,973 B1 | 11/2006 | Kirkwood et al. |
| 7,143,095 B2 | 11/2006 | Barrett et al. |
| 7,162,640 B2 | 1/2007 | Heath et al. |
| 7,171,458 B2 | 1/2007 | Brown et al. |
| 7,185,073 B1 | 2/2007 | Gai et al. |
| 7,209,970 B1 | 4/2007 | Everson et al. |
| 7,213,266 B1 | 5/2007 | Maher et al. |
| 7,216,181 B1 | 5/2007 | Jannu et al. |
| 7,231,460 B2 | 6/2007 | Sullivan et al. |
| 7,243,370 B2 | 7/2007 | Bobde et al. |
| 7,284,043 B2 | 10/2007 | Feinleib et al. |
| 7,299,504 B1 | 11/2007 | Tiller et al. |
| 7,346,766 B2 | 3/2008 | Mackin et al. |
| 7,356,601 B1 | 4/2008 | Clymer et al. |
| 7,356,816 B2 | 4/2008 | Goodman et al. |
| 7,379,996 B2 | 5/2008 | Papatla et al. |
| 7,418,597 B2 | 8/2008 | Thornton et al. |
| 7,421,555 B2 | 9/2008 | Dorey |
| 7,426,642 B2 | 9/2008 | Aupperle et al. |
| 7,428,583 B1 | 9/2008 | Lortz et al. |
| 7,440,962 B1 | 10/2008 | Wong et al. |
| 7,444,401 B1 | 10/2008 | Keyghobad et al. |
| 7,467,141 B1 | 12/2008 | Steele et al. |
| 7,478,418 B2 | 1/2009 | Supramaniam et al. |
| 7,483,979 B1 | 1/2009 | Prager |
| 7,487,535 B1 | 2/2009 | Isaacson et al. |
| 7,519,813 B1 | 4/2009 | Cox et al. |
| 7,584,502 B2 | 9/2009 | Alkove et al. |
| 7,591,005 B1 | 9/2009 | Moore |
| 7,617,501 B2 | 11/2009 | Peterson et al. |
| 7,650,497 B2 | 1/2010 | Thornton et al. |
| 7,653,794 B2 | 1/2010 | Michael et al. |
| 7,661,027 B2 | 2/2010 | Langen et al. |
| 7,673,323 B1 | 3/2010 | Moriconi |
| 7,690,025 B2 | 3/2010 | Grewal et al. |
| 7,765,187 B2 | 7/2010 | Bergant et al. |
| 7,805,721 B2 | 9/2010 | Feinleib et al. |
| 7,895,332 B2 | 2/2011 | Vanyukhin et al. |
| 7,904,949 B2 | 3/2011 | Bowers et al. |
| 7,987,455 B1 | 7/2011 | Senner et al. |
| 8,024,360 B2 | 9/2011 | Moore |
| 8,086,710 B2 | 12/2011 | Vanyukhin et al. |
| 8,087,075 B2 | 12/2011 | Peterson et al. |
| 8,141,138 B2 | 3/2012 | Bhatia et al. |
| 8,245,242 B2 | 8/2012 | Peterson et al. |
| 8,346,908 B1 | 1/2013 | Vanyukhin et al. |
| 8,346,929 B1 * | 1/2013 | Lai ............. 709/226 |
| 8,560,593 B2 | 10/2013 | Ghostine |
| 2001/0034733 A1 | 10/2001 | Prompt et al. |
| 2002/0055949 A1 | 5/2002 | Shiomi et al. |
| 2002/0069174 A1 * | 6/2002 | Fox et al. ............. 705/52 |
| 2002/0078005 A1 | 6/2002 | Shi et al. |
| 2002/0112178 A1 | 8/2002 | Scherr |
| 2002/0129274 A1 | 9/2002 | Baskey et al. |
| 2002/0133723 A1 | 9/2002 | Tait |
| 2002/0138572 A1 | 9/2002 | Delany et al. |
| 2002/0169986 A1 | 11/2002 | Lortz |
| 2002/0169988 A1 | 11/2002 | Vandergeest et al. |
| 2002/0174366 A1 | 11/2002 | Peterka et al. |
| 2002/0178377 A1 | 11/2002 | Hemsath et al. |
| 2002/0184536 A1 | 12/2002 | Flavin |

(56) References Cited

U.S. PATENT DOCUMENTS

| | | |
|---|---|---|
| 2003/0009487 A1 | 1/2003 | Prabakaran et al. |
| 2003/0018913 A1 | 1/2003 | Brezak et al. |
| 2003/0023587 A1 | 1/2003 | Dennis et al. |
| 2003/0028611 A1 | 2/2003 | Kenny et al. |
| 2003/0033535 A1 | 2/2003 | Fisher et al. |
| 2003/0065731 A1* | 4/2003 | Mohammed ............ G06F 21/33 709/208 |
| 2003/0065940 A1 | 4/2003 | Brezak et al. |
| 2003/0065942 A1 | 4/2003 | Lineman et al. |
| 2003/0110397 A1 | 6/2003 | Supramaniam et al. |
| 2003/0115186 A1 | 6/2003 | Wilkinson et al. |
| 2003/0115313 A1 | 6/2003 | Kanada et al. |
| 2003/0115439 A1 | 6/2003 | Mahalingam et al. |
| 2003/0149662 A1* | 8/2003 | Shore .................... G06Q 20/04 705/39 |
| 2003/0149781 A1* | 8/2003 | Yared et al. .................. 709/229 |
| 2003/0177388 A1 | 9/2003 | Botz et al. |
| 2003/0188036 A1 | 10/2003 | Chen et al. |
| 2003/0229783 A1 | 12/2003 | Hardt |
| 2004/0010519 A1 | 1/2004 | Sinn et al. |
| 2004/0059953 A1 | 3/2004 | Purnell |
| 2004/0078341 A1* | 4/2004 | Steichen ........................ 705/64 |
| 2004/0078569 A1 | 4/2004 | Hotti |
| 2004/0088385 A1* | 5/2004 | Blanchet .......... H04L 29/12358 709/220 |
| 2004/0088543 A1 | 5/2004 | Garg et al. |
| 2004/0098595 A1 | 5/2004 | Aupperle et al. |
| 2004/0098615 A1 | 5/2004 | Mowers et al. |
| 2004/0111515 A1 | 6/2004 | Manion et al. |
| 2004/0111643 A1 | 6/2004 | Farmer |
| 2004/0117382 A1 | 6/2004 | Houseknecht et al. |
| 2004/0123146 A1 | 6/2004 | Himmel et al. |
| 2004/0128542 A1 | 7/2004 | Blakley et al. |
| 2004/0139050 A1 | 7/2004 | Barrett et al. |
| 2004/0139081 A1 | 7/2004 | Barrett et al. |
| 2004/0199795 A1 | 10/2004 | Grewal et al. |
| 2004/0226027 A1 | 11/2004 | Winter |
| 2004/0260565 A1 | 12/2004 | Zimniewicz et al. |
| 2004/0260651 A1 | 12/2004 | Chan et al. |
| 2005/0010547 A1 | 1/2005 | Carinci et al. |
| 2005/0044409 A1 | 2/2005 | Betz et al. |
| 2005/0055357 A1 | 3/2005 | Campbell |
| 2005/0055577 A1* | 3/2005 | Wesemann .......... H04L 63/0272 726/4 |
| 2005/0060397 A1 | 3/2005 | Barthram et al. |
| 2005/0086457 A1 | 4/2005 | Hohman |
| 2005/0091068 A1 | 4/2005 | Ramamoorthy et al. |
| 2005/0091213 A1 | 4/2005 | Schutz et al. |
| 2005/0091250 A1 | 4/2005 | Dunn et al. |
| 2005/0091284 A1 | 4/2005 | Weissman et al. |
| 2005/0091290 A1 | 4/2005 | Cameron et al. |
| 2005/0097441 A1* | 5/2005 | Herbach ................. G06F 21/10 715/229 |
| 2005/0108579 A1 | 5/2005 | Isaacson et al. |
| 2005/0114701 A1 | 5/2005 | Atkins et al. |
| 2005/0125798 A1 | 6/2005 | Peterson |
| 2005/0144463 A1 | 6/2005 | Rossebo et al. |
| 2005/0193181 A1 | 9/2005 | Kaneda et al. |
| 2005/0198303 A1 | 9/2005 | Knauerhase et al. |
| 2005/0204143 A1 | 9/2005 | Ellington |
| 2005/0223216 A1 | 10/2005 | Chan et al. |
| 2005/0223217 A1* | 10/2005 | Howard et al. ............... 713/155 |
| 2005/0246554 A1 | 11/2005 | Batson |
| 2005/0267938 A1 | 12/2005 | Czeczulin |
| 2005/0268309 A1 | 12/2005 | Krishnaswamy et al. |
| 2005/0283443 A1 | 12/2005 | Hardt |
| 2005/0283614 A1 | 12/2005 | Hardt |
| 2006/0004794 A1 | 1/2006 | Pizzo et al. |
| 2006/0005229 A1 | 1/2006 | Palekar et al. |
| 2006/0010445 A1 | 1/2006 | Peterson et al. |
| 2006/0015353 A1 | 1/2006 | Reese |
| 2006/0020783 A1* | 1/2006 | Fisher .......................... 713/156 |
| 2006/0021017 A1 | 1/2006 | Hinton et al. |
| 2006/0026195 A1 | 2/2006 | Gu et al. |
| 2006/0034494 A1 | 2/2006 | Holloran |
| 2006/0085483 A1 | 4/2006 | Mooney et al. |
| 2006/0116949 A1 | 6/2006 | Wehunt et al. |
| 2006/0130065 A1 | 6/2006 | Chin et al. |
| 2006/0161435 A1 | 7/2006 | Atef et al. |
| 2006/0174350 A1 | 8/2006 | Roever et al. |
| 2006/0184401 A1 | 8/2006 | DelGaudio et al. |
| 2006/0200424 A1 | 9/2006 | Cameron et al. |
| 2006/0200504 A1 | 9/2006 | Lo |
| 2006/0224611 A1 | 10/2006 | Dunn et al. |
| 2006/0248099 A1 | 11/2006 | Barrett et al. |
| 2006/0265740 A1 | 11/2006 | Clark et al. |
| 2006/0282360 A1 | 12/2006 | Kahn et al. |
| 2006/0282461 A1 | 12/2006 | Marinescu |
| 2006/0294151 A1 | 12/2006 | Wong et al. |
| 2007/0011136 A1 | 1/2007 | Haskin et al. |
| 2007/0038596 A1 | 2/2007 | Pizzo et al. |
| 2007/0083917 A1 | 4/2007 | Peterson et al. |
| 2007/0100980 A1 | 5/2007 | Kataoka et al. |
| 2007/0101415 A1 | 5/2007 | Masui |
| 2007/0143430 A1 | 6/2007 | Johnson et al. |
| 2007/0143836 A1 | 6/2007 | Bowers et al. |
| 2007/0150448 A1 | 6/2007 | Patnode |
| 2007/0156766 A1 | 7/2007 | Hoang et al. |
| 2007/0156767 A1 | 7/2007 | Hoang et al. |
| 2007/0180448 A1 | 8/2007 | Low et al. |
| 2007/0180493 A1* | 8/2007 | Croft et al. ...................... 726/2 |
| 2007/0192843 A1 | 8/2007 | Peterson |
| 2007/0255814 A1 | 11/2007 | Green et al. |
| 2007/0288992 A1 | 12/2007 | Robinson et al. |
| 2008/0021866 A1* | 1/2008 | Hinton et al. .................... 707/2 |
| 2008/0104220 A1 | 5/2008 | Vanyukhin |
| 2008/0104250 A1 | 5/2008 | Vanyukhin |
| 2008/0133533 A1 | 6/2008 | Ganugapati et al. |
| 2008/0162604 A1 | 7/2008 | Soulet et al. |
| 2008/0215867 A1 | 9/2008 | Mackin et al. |
| 2009/0006537 A1 | 1/2009 | Palekar et al. |
| 2009/0063667 A1* | 3/2009 | Smith .................... G06Q 10/02 709/222 |
| 2009/0106834 A1* | 4/2009 | Borzycki .............. H04L 63/166 726/21 |
| 2009/0210934 A1* | 8/2009 | Innes ................................ 726/7 |
| 2009/0216975 A1 | 8/2009 | Halperin et al. |
| 2010/0050232 A1 | 2/2010 | Peterson |
| 2011/0093570 A1 | 4/2011 | Mackin et al. |
| 2011/0282977 A1 | 11/2011 | Peterson |
| 2011/0283273 A1 | 11/2011 | Peterson |
| 2012/0192256 A1 | 7/2012 | Peterson et al. |
| 2012/0215899 A1 | 8/2012 | Peterson |
| 2012/0297035 A1 | 11/2012 | Peterson |
| 2013/0212707 A1* | 8/2013 | Donahue et al. ................ 726/29 |

FOREIGN PATENT DOCUMENTS

| | | |
|---|---|---|
| WO | WO 2006/016900 | 2/2006 |
| WO | WO 2007/044613 A2 | 4/2007 |

OTHER PUBLICATIONS

"Description of Digital Certificates", Jan. 23, 2007, http://www.support.microsoft.com/kb/195724.

"Directory Administrator", http://diradmin.open-it.org/indexlphp, p. 1-3. Dec. 15, 2004.

"Innovation Report—Windows Group Policy Protocols". Jul. 31, 2006.

"LDAP Linux HOWTO", http://tldp/org/HOWTO/LDAP-HOWTO/, p. 1-2. Mar. 5, 2004.

"Lnux Authentication Against Active Directory", http://laaad/sourceforge.netlen/home/htm, p. 1-2. Dec. 15, 2004.

"NegotiateAuth", http://negotiateauth,mozdev.org/ Jul. 8, 2010.

"Optimization Techniques for Trusted Semantic Interoperation", Final Technical Report, Air Force Research Laboratory. Published May 1998.

"Project: AD4Unix: Summary", http://sourceforge.netlprojects/adunixl, p. 1-3. Dec. 15, 2004.

"Replacing NIS with Kerberos and LDAP", http://ofb.netHhess/krbldap/, p. 1-2. Dec. 15, 2004.

(56) References Cited

OTHER PUBLICATIONS

"Sadma", http://sadmas.sourceforge.netlen/indexlhtml. p. 1-2. Dec. 15, 2004.
"Sun Enterprise Authentication Mechanism Data Sheet", http://wwws.sun.com/jsp_utils/Printpage.jsp?url, pp. 1-4. Dec. 15, 2004.
Vintela Extends the Reach of Microsoft Group Policy to Unix and Linux; Vintela Group Policy (VGP) Provides a Framework for Unix and Linux Policy-Based Management Through the Popular Windows Group Policy System., PR Newswire, Sep. 13, 2004.
A. Leonard, "Embrace, extend, censor", Originally published May 11, 2000 on salon.com, http://archive.salon.com/tech/log/2000/05/11/slashdot_censor/.
Aelita Software Domain Migration Wizard 6.0 User's Guide, Aug. 21, 2003.
AIX 5L Differences Guide Version 5.2 Edition Published Dec. 24, 2002, Excerpt http://proquest.safaribooksonline.com/0738427047/ch09lev1sec13.
Akhgar et al., Secure ICT Services for Mobile and Wireless Communications: A Federated Global Identity Management Framework, 2006 IEEE.
Alan H. Harbitter et al., "Performance of Public-Key-Enabled Kerberos Authentication in Large Networks", Proceedings of the IEEE symposium on Security and Privacy. 2001.
Antti Tikkanen, "Active Directory and nss_idap for Linux: Centralized er Management," printed from http://www.hut.fi/cc/docskerberos/nss_ldap/htm, pp. 1-11, 2004.
Apurva Kumar, "The OpenLDAP Proxy Cache," IBM, India Research Lab, at least as early as May 2003.
Authentication, from Pieces of the Puzzle, Chapter 2, p. 12. (Exhibit IV to U.S. Appl. No. 95/001,872, Inter Partes Reexamination Renewed Petition (Third Party Requester to Response to Mar. 1, 2012 Office Action), dated Aug. 9, 2012.
Buell, D.A. et al., "Identity management", Internet Computing, IEEEvol. 7, Issue 6, Nov.-Dec. 2003 pp. 26-28.
Centrify DirectControl Administrator's Guide Version 2.0, Aug. 15, 2005.
Chapter 9 Authentication Protocols, Distributed System & Network Security Lab, Department of Computer Science & Information Engineering, National Chiao Tung University, pp. 21-22. 1991.
COSuser—Identity management and user provisioning for Unix, Linux and Microsoft Windows® http://www.cosuser.com/ May 24, 2010.
Damiani, E., et al, "Managing multiple and dependable identities" Internet Computing, IEEEvol. 7, Issue 6, Nov.-Dec. 2003 pp. 29-37.
David "Del" Elson, "Active Directory and Linux," printed from http://www.securityfoc.com/printable/infoc /1563, pp. 1-11, 2002.
David F. Carr, "What's Federated Identity Management?", eWeek, Nov. 10, 2003, http://www.eweek.com/printarticle/O,1761.a-111811,00.asp.
Dennis, Disconnect Login (Was: FC3 Bug Week—Help Wanted) (Sep. 24, 2004).
Description of Digital Certificates, Jan. 23, 2007, available at http://www.support.microsoft.com/kb/195724.
Designing Network Security Published May 7, 1999. Excerpt http://proquest.safaribooksonline.com/1578700434/ch02lev1sec1.
Documentation for Kerberos V5 release krb5-1.3, Copyright 1985-2002, Installation Guide: http://web.mit.edu/Kerberos/krb5-1.6/krb5-1.6/doc/krb5-install.html.
Documentation for Kerberos V5 release krb5-1.3, Copyright 1985-2002, Installation Guide: http://web.mit.edu/Kerberoslkrb5-1.3/krb5-1.3/doc/krb5-install.html—System Administrator's Guide: http://web.mit.edu/Kerberos/krb5-1.3/krb5-1.3/doc/krb5-admin.html—UNIX User's Guide: http://web.mit.edu/Kerberos/krb5-1.3/krb5-1.3/doc/krb5- er.html.
Documentation for Kerberos V5 release krb5-1.3, Copyright 1985-2002, System Administrator's Guide: http://web.mit.edu/Kerberos/krb5-1.6/krb5-1.6/doc/krb5-admin.html.
Documentation for Kerberos V5 release krb5-1.3, Copyright 1985-2002, UNIX User's Guide: http://web.mit.edu/kerberos/www/krb5-1.2/krb5-1.2.6/doc/user-guide.html.

Fabini et al., "IMS in a Bottle: Initial Experiences from an OpenSER-based Prototype Implementation of the 3GPP IP Multimedia Subsystem" Mobile Business, 2006. ICMB '06. International Conference on Publication Date: 2006; On pp. 13-13.
Garman, "Kerberos—The Definitive Guide," Aug. 2003, O'Reilly & Associates, Inc.
Get to One Options for moving from multiple, Unix identities to a single, AD-based authentication infrastructure with Vintela Authentication Serviceshttp://www.quest.com/Vintela_Authentication_Services/migration_options_VAS.aspx May 24, 2010.
Hank Simon, "SAML:The Secret to Centralized Identity Management", Dec. 2004, http://intelligententerprise.com/showArticle.jhtml?articleID=54200324.
IBM SecureWay Policy Director, 1999. (4 pages).
IBM z/OS V1R1.0-V1R12.0 DCE Application Development Reference: dce_ace_is_cient_authorized API call: URL: http://publib.boulder.ibm.com/infocenter/zos/v1r12/topic/com.ibm.zos.r12.euvmd00/euva6a00646.htm, Copyright IBM Corporation 1990,2010, (2 pages).
Identity Management for UNIX http://technet2.microsoft.com/WindowsServer/en/library/ab66b7d2-9cfb-4d76-b707-30a5e0dd84f31033.mspx?mfr=true Aug. 22, 2005.
Implementing Registry-Based Group Policy for Applications, Microsoft Windows 2000 Server. White Paper. 2000.
Introduction to Group Policy in Windows Server 2003, Microsoft Corporation, Published Apr. 2003.
J. Barr, "The Gates of Hades: Microsoft attempts to co-opt Kerberos", Published Apr. 2000 as verified by the Internet Archive, http://web.archive.org/web/20000619011652/http://www.linuxworld.com/linuxworld/lw-2000-04/lw-04-vcontrol_3.html.
J. Brezak, "HTTP Authentication: SPNEGO Access Authentication as Implemented in Microsoft Windows 2000," http://Meta.cesnet.cz/cms/opencms/en/docs/software/devel/draft-brezek-spnego-http-04.xt, pp. 1-6. 2002.
J. Kohl et al. "RFC 1510: The Kerberos Network Authentication Service (V5)", Published Sep. 1993, http://ietfreport.isoc.org/rfc/PDF/rfc1510.pdf.
Jan De Clercq, "Win.NET Server Kerberos", http://www.winnetmag.com/WindowsSecurity/ Articles|ArticleID/26450/pg/3/3.html. Sep. 17, 2002.
John Brezak, "Interoperability with Microsoft Windows 2000 Active Directory and Kerberos Services," printed from http://msdn.microsft.com/library/en- /dnactdir/html/kerberossamp.asp?frame=true, pp. 1-4, 2000.
Kerberos, PACs, and Microsoft's Dirty Tricks Originally posted to slashdot.org on May 2, 2000, http://slashdot.org/comments.pl?sid=5268&threshold=1&commentsort=O&mode=thread&cid=1096250.
Langella, S. et al., "Dorian: Grid Service Infrastructure for Identity Management and Federation", Computer-Based Medical Systems, 2006. CBMS 2006. 19th IEEE International Symposium on Jun. 22-23, 2006 pp. 756-761.
Li, M., et al., "Identity management in vertical handovers for UMTS-WLAN networks", Mobile Business, 2005. ICMB 2005. International Conference on Jul. 11-13, 2005 pp. 479-484.
LinuX® and Windows® Interoperability Guide, Published Dec. 14, 2001, Excerpt http://proquest.safaribooksonline.com/0130324779/ch 18/lev1sec3.
Lowe-Norris, Alistair G., Windows 2000 Active Directory, Chapters 8 and 9, pp. 177-245, Jan. 2000.
Matsunaga et al, "Secure Authentication System for Public WLAN Roaming, Proceedings of the 1st ACM international workshop on Wireless mobile applications and services on WLAN hotspots," San Diego, CA, A, Year of Publication: 2003, p. 113-121.
Matthew Hur, "Session Code: ARC241 architecture & infrastructure", Microsoft Corporation. Oct. 26, 2003.
MCSE in a Nutshell: The Windows 2000 Exams Published Feb. 2001. Excerpt http://proquest.safaribooksonline.com/0596000308/mcseian-CHP-13-SECT-1.
Microsoft Corp., Implementing Registry-Based Group Policy for Applications, 2000.
Microsoft Corp., Introduction to Group Policy in Windows Server 2003, 2003.

(56) References Cited

OTHER PUBLICATIONS

Microsoft: CATIA Migration from UNIX to Windows, Overview, Jul. 18, 2003. (3 pages).
Microsoft: CATIA Migration from UNIX to Windows, Overview, Jul. 18, 2003, Microsoft, Chapter 8, Windows-Unix Interoperability and Data Sharing. (21 pages).
Mikkonen, H. et al., "Federated Identity Management for Grids" Networking and Services, 2006. ICNS '06. International conference onJul. 16-18, 2006 pp. 69-69.
Mont, M.C. et al., "Towards accountable management of identity and privacy: sticky policies and enforceable tracing services", Database and Expert Systems Applications, 2003. Proceedings. 14th International Workshop on Sep. 1-5, 2003 pp. 377-382.
NCSA Introduction to Kerberos 5, All right reserved Board of Trustees of the University of Illinois Page last updated May 21, 2002 http://www.ncsa.uiuc.edu/UserInfo/Resources/Sofiware/kerberosold/introduction.html.
Neuman et al., "RFC 4120—The Kerberos Network Authentication Service V5," Network Working Group, Jul. 2005.
Neuman, et al.: "Kerberos: An Authentication Service for Computer Networks", IEEE Communications Magazine, vol. 32, Issue 9, Pub. Date Sep. 1994, relevant pp. 33-38.
O'Reily publications "Unix & Internet Security", Apr. 1996. (3 pages).
PADL Software Pty Ltd., http://www.padl.com/productsIXAD.html, pp. 1-3. Dec. 15, 2004.
PADL Software Pty Ltd., Pam_ccreds readme, (Apr. 11, 2004) (pan_crreds).
Phiri, J. et al., "Modelling and Information Fusion in Digital Identity Management Systems" Networking, International Conference on Systems and International Conference on Mobile Communications and Learning Technologies, 2006. ICN/ICONS/MCL 2006. International Conference on Apr. 23-29, 2006 pp. 181-181.
Quest Software; "UNIX Identity Migration Wizard User Guide", 2006.
Quest Vintela Authentication Services Administrator's Guide Version 3.1, Sep. 2006.
Radeke, E., et al. "Framework for object migration in federated database systems", Cooperation Univ. of Paderborn, Germany, Parallel and Distributed Information Systems, 1994., Proceedings of the Third International Conference on Publication Date: Sep. 28-30, 1994, On pp. 187-194.
RFC 4120—"The Kerberos Network Authentication Service V5," Neuman et al., Network Working Group, Jul. 2005.
Sandrasegaran, Hsang, Identity Management in Vertical Handovers for UMTS-WLAN Networks, 2005 IEEE.
Search Security, "Search Security.com Definitions", Jun. 4, 2007, http://searchsecurity.techtarget.com/sDefinition/0,,sid14_gci212437,00.html.
Shim, S.S.Y et al., "Federated identity management" Computer; vol. 38, Issue 12, Dec. 2005 pp. 120-122.
Shin, D. et al "Ensuring information assurance in federated identity management", Performance, Computing, and Communications, 2004 IEEE International Conference on 2004 pp. 821-826.
Siddiqi, J. et al., "Secure ICT Services for Mobile and Wireless Communications: A Federated Global Identity Management Framework", Information Technology: New Generations, 2006. ITNG 2006. Third International Conference on Apr. 10-12, 2006 pp. 351-357.
Sixto Ortiz, Jr., "One-Time Password Technology", vol. 29, Issue 15, Apr. 13, 2007, http://www.processor.com/editorial/article.asp?article=articles%2Fp2915%2F30p15%2F30p15.asp.
Subject 2.15. What do I need to do to setup cross-realm authentication?, http://www.cmf.nrl.navy.mil/CCS/people/kenh/kerberos-fag. html. Jul. 8, 2010.
The SLAPD and SLURPD Administrator's Guide, University of Michigan Release 3.3 Apr. 30, 1996, available at http://www.umich.edu/~dirsvcs/ldap/doc/guides/slapd/guide.pdf.
Turbo Fredriksson, "LDAPv3." printed from http://www.bayour.com/LDAPv3-HOWTO.html, pp. 2-65, 2001.
Ventuneac et al., A policy-based security framework for Web-enabled applications, Proceeding ISICT '03, Proceedings of the 1st International Symposium on Information and Communication Technologies, pp. 487-492.
Vintela Group Policy Technology Preview, "Extending the Power of Group Policy and Windonws Active Directory to configuration of Unix and Linux users and systems", Version 0.1, May 2004.
Wedgetail Communications; "Security Assertion Markup Language (SAML)", 2004.
Weitzner, D.J., "In Search of Manageable Identity Systems", IEEE Internet Computing, vol. 10, Issue 6, Nov.-Dec. 2006 pp. 84-86.
Windows 2000 Kerberos Authentication White Paper, Microsoft Windows 2000 Server, pp. 1-5 and 41-42. Jul. 12, 2010.
Withers, Integrating Windows 2000 and UNIX Using Kerberos, The Journal for UNIX Systems Administrators, vol. 10, No. 12, Dec. 2001. http://seann.herdejurgen.com/resume/samag.com/html/v10/i12/a5.htm.
"Kerberos Module for Apache"; http://modauthkerb.sourceforge.net/; as accessed on Dec. 15, 2004; 1 page.

\* cited by examiner

SINGLE SIGN-ON SYSTEM FOR SHARED RESOURCE ENVIRONMENTS

RELATED APPLICATIONS

The disclosure of each application identified in the domestic benefit, national stage information, or foreign priority sections of any Application Data Sheet or Supplemental Application Data Sheet filed in this application is hereby incorporated by reference, in its entirety, into this application.

BACKGROUND

Many companies take advantage of virtualization solutions to consolidate several specialized physical servers and workstations into fewer servers running virtual machines. Each virtual machine can be configured with its own set of virtual hardware (e.g., processor, memory, ports, and the like) such that specialized services that each of the previous physical machines performed can be run in their native operating system. In particular, a virtualization layer, or hypervisor, allocates the computing resources of one or more host servers into one or more virtual machines and further provides for isolation between such virtual machines. In such a manner, the virtual machine is a representation of a physical machine by software.

Virtualization solutions can be adapted to provide virtual desktop computing (VDC). In VDC systems, each virtual machine can represent a virtual desktop, which can be accessed remotely by a client machine. By providing virtual desktops, VDC systems can allow users to access their applications and data from any remote computing device. VDC systems also centralize and streamline desktop administration for IT administrators.

Terminal Services is a MICROSOFT WINDOWS component that provides benefits similar to the benefits of VDC systems. A machine running Terminal Services is a Terminal Server, which can act like a mainframe multi-user operating system. As such, the Terminal Server can allow multiple concurrent users to start a remote interactive Windows session. Like VDC systems, Terminal Servers centralize user application and data, allowing remote access and efficient IT administration.

Authentication to a virtual desktop or Terminal Server can be performed using single sign-on authentication. Single sign-on authentication is a technique that can reduce or eliminate credentials re-prompting each time a user accesses a computing resource, such as a virtual desktop, Terminal Server session, or application.

SUMMARY

Systems and methods for enhancing security of single sign-on are described. These systems and methods can reduce the amount of sensitive information stored on a client device while still providing single sign-on access to shared resources such as virtual desktops or Terminal Servers. For example, storage of authentication information on client devices can be avoided while still allowing client devices to connect to the shared resources. Instead, such information can be stored at a broker server that brokers connections from client devices to the shared resources. The broker server can facilitate more secure single sign-on by providing a single-use ticket to a client device that authenticates with the broker server. The client device can use this single-use ticket to authenticate with a shared resource.

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

In a server-based computing environment, shared resources such as virtual desktops and/or Terminal Servers can be pooled in a centralized data center. Client devices can initiate network connections with the shared resources using a remote protocol, allowing these clients to establish interactive computing sessions.

Prior to establishing a connection, a client can be authenticated and provided with an authorized list of named resources. These named resources represent shared resources that the client is eligible to access. A network service, referred to as a broker, can be responsible for authenticating the client and providing it with an authorized list of named resources based at least partly on the client's identity and other network and security attributes. Upon requesting connectivity to a particular named resource, the broker can also be responsible for resolving the named resource to an actual network address that the client can use to establish a connection.

Single sign-on ("SSO") authentication to shared resources can be implemented by storing a user's credentials (e.g., username and password) and shared resource connectivity information in a launch file on a client device. Once a client has authenticated with a broker, the client can use the launch file to access a shared resource without resubmitting the credentials. A downside of this approach is that even if the launch file is encrypted, the launch file can be hijacked. Malicious users can use the launch file to gain unauthorized access to the shared resources.

This disclosure therefore describes systems and methods for enhancing SSO security in shared resource environments, such as virtual desktop and Terminal Server environments. In certain embodiments, these systems and methods can reduce the amount of sensitive information stored on a client device while still providing SSO access. For example, in some embodiments, storage of credentials and/or connectivity information on client devices can be avoided altogether. Instead, such information can be stored at a broker server. In one embodiment, the broker server provides a single-use ticket to a client device that authenticates with the broker server. The client device can then use this single-use ticket to authenticate with a shared resource. Advantageously, in certain embodiments, security in shared resource environments is therefore enhanced.

II. Example Shared Resources Systems

Figure 1:
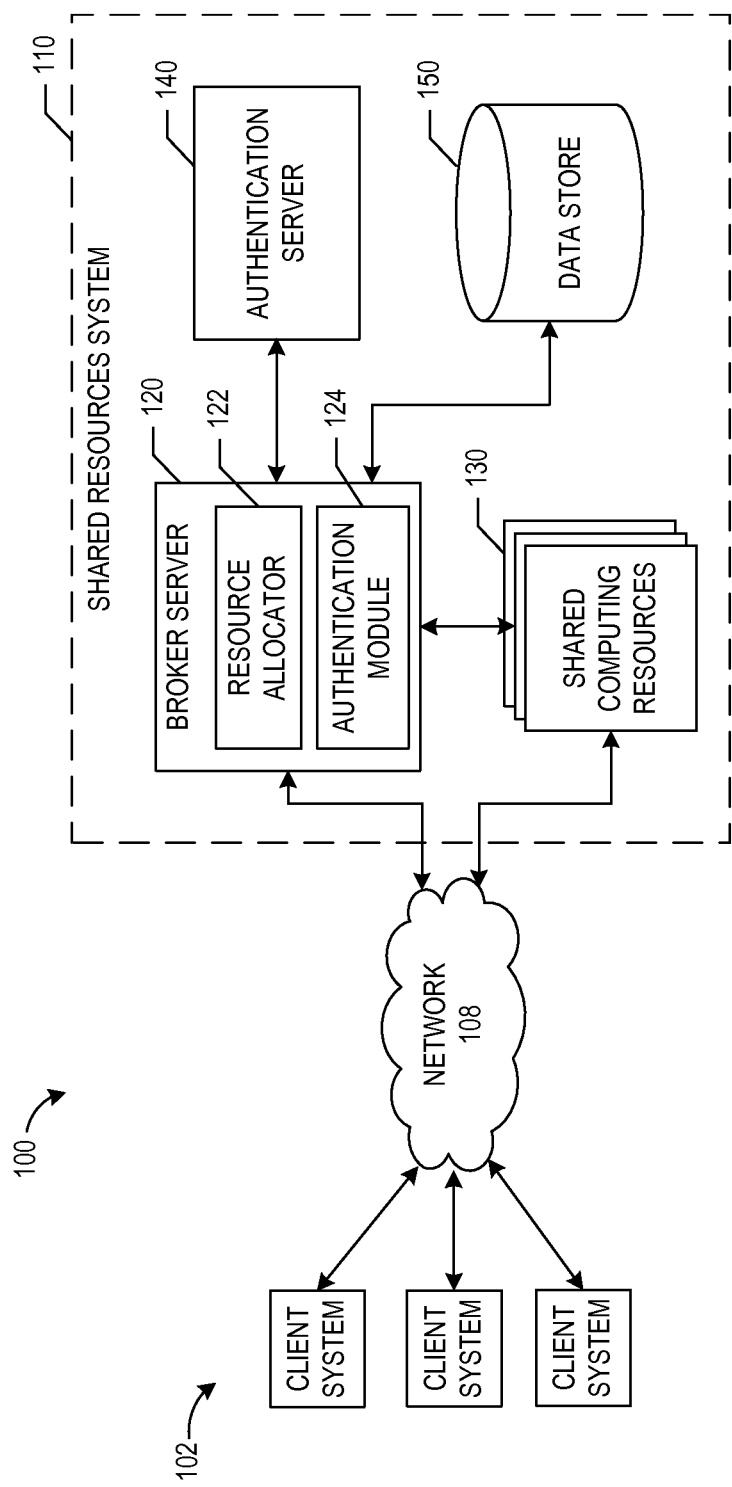
FIG. 1 illustrates an embodiment of a network environment for providing access to a shared resources system.

FIG. 1 illustrates an embodiment of a network environment 100 for providing access to a shared resources system 110. The shared resources system 110 can provide access for users of client systems 102 to shared computing resources 130. These shared resources 130 can include virtual desktops, Terminal Servers, blade computers (such as blade PCs), applications, and the like. Advantageously, in certain embodiments, the shared resources system 110 also provides more secure SSO access to these resources 130.

The shared resources system 110 can be implemented by one or more physical computing devices, such as servers. These computing devices can be distributed geographically or can be co-located. The client systems 102 can include, for example, desktop computers, workstations, personal digital assistants (PDAs), mobile phones, other wireless handheld devices, laptop computers, tablets, and the like.

The client systems 102 can further include various software applications for accessing the shared resources system 110, such as browser software applications, stand-alone software applications, plug-ins, interfaces, combinations of the same, and the like. The client systems 102 can access the shared resources system 110 over a network 108, which can include a local or wide area network (LAN or WAN), such as an organization's intranet, the Internet, combinations of the same, and the like.

In the depicted embodiment, the shared resources system 110 includes a broker server 120, the shared resources 130 described above, an authentication server 140, and a data store 150. Each of these components can be implemented in software and/or hardware. For example, in one embodiment, the broker server 120 represents a physical computing device. In another embodiment, the broker server 120 represents a software service executing on a physical computing device. Although the various components of the shared resources system 110 are illustrated separately, some or all of them can be implemented together in one or more of the same computing devices.

The broker server 120 can allow the client systems 102 to communicate with the broker server 120 to obtain access to the shared resources 130. The example broker server 120 shown includes a resource allocator 122 and an authentication module 124. The resource allocator 122 can perform load balancing in certain embodiments by allocating shared resources 130 to client systems 102 in a manner that reduces the load on any given resource 130. The authentication module 124 can provide SSO access for the client systems 102 to the shared resources 130. The features of the authentication module 124 are described in greater detail below. In certain embodiments, the broker server 120 can also implement certain features of the broker described in U.S. patent application Ser. No. 12/078,174, filed Mar. 27, 2008, titled "System for Provisioning, Allocating, and Managing Virtual and Physical Desktop Computers in a Network Computing Environment," (the "'174 application") the disclosure of which is hereby incorporated by reference in its entirety.

As described above, the shared resources 130 can include virtual desktops, Terminal Servers, and blade computers (such as blade PCs), applications, combinations of the same, and the like. The shared resources 130 can be implemented using any of the features described in the '174 application referred to above. Further, in embodiments where the shared resources 130 include virtual desktops, the shared resources 130 can include virtual machines implemented on a hypervisor. The hypervisor can allow multiple virtual desktops having possibly different operating systems to run on a host computer at the same time.

For instance, the hypervisor can include a thin piece of software that runs directly on top of a hardware platform of a host computer and that virtualizes resources of the computer (e.g., a native or "bare-metal" hypervisor). In such embodiments, the virtual desktops can run, with their respective operating systems, on the hypervisor without the need for a host operating system. Examples of such bare-metal hypervisors can include, but are not limited to, ESX SERVER by VMware, Inc. (Palo Alto, Calif.), XEN and XENSERVER by Citrix Systems, Inc. (Fort Lauderdale, Fla.), ORACLE VM by Oracle Corporation (Redwood City, Calif.), HYPER-V by Microsoft Corporation (Redmond, Wash.), VIRTUOZZO by Parallels, Inc. (Switzerland), and the like.

In yet other embodiments, the virtual desktops can have a hosted architecture in which the hypervisor runs within a host operating system environment. In such embodiments, the hypervisor can rely on the host operating system for device support and/or physical resource management. Examples of such hosted hypervisors can include, but are not limited to, VMWARE WORKSTATION and VMWARE SERVER by VMware, Inc., VIRTUAL SERVER by Microsoft Corporation, PARALLELS WORKSTATION by Parallels, Inc., or the like.

In certain embodiments, each virtual desktop includes a guest operating system and associated applications. In such embodiments, the virtual desktop accesses the resources (e.g., privileged resources) of the host computer through the hypervisor. Many other variations in virtualization technology are possible.

As described above, the authentication module 124 of the broker server 120 can provide users with SSO access to the shared resources 130. In one embodiment, the authentication module 124 receives initial client system 102 requests to access the broker server 120. For example, a user of a client system 102 can log into the broker server 120 with credentials. Credentials can include a user name and password. In addition, in some network environments, credentials can further include a domain name to which a client system 102 belongs, among other identifying information. As will be described in detail below under the section entitled "Additional Embodiments," authentication information other than credentials can be used by the client system 102 in some implementations.

The authentication module 124 can receive the user credentials and access the authentication server 140 to determine whether the user credentials match any credentials stored by the authentication server 140. If the credentials match, the authentication module 124 can then provide the client system 102 with access to one or more of the shared resources 130 without re-prompting the user for the credentials.

One mechanism that the authentication module 124 can use to provide client systems 102 with access to shared resources 130 is to provide tickets to the client systems 102. A ticket can include any piece of data, such as metadata. A client system 102 in possession of a valid ticket received from the authentication module 124 can provide the ticket to a shared resource 130. The shared resource 130 can then send the ticket (or some other data derived therefrom) to the authentication module 124 to verify that the user of the client system 102 can access the shared resource 130. The authentication module 124 can perform this verification in some embodiments by sending the user credentials to the shared resource 130. The authentication module 124 can store user credentials and tickets in the data store 150 or in memory.

In some embodiments, the ticket provided by the authentication module 124 is a single-use ticket. The client system 102 can use this single-use ticket to connect to a single shared resource 130. A benefit of single-use tickets, in certain embodiments, is that subsequent use of the ticket by a malicious user can result in denial of access to the shared resource 130. In some embodiments, the authentication module 124 can also establish an expiration period or time to live (TTL) for the ticket, such as 30 seconds, 60 seconds, several minutes, or some other time. If a client system 102 does not attempt to connect or does not actually connect with a shared resource 130 before the ticket expires, the client system 102 can be denied access to the shared resource 130. Further, the ticket can be encrypted with a single or multi-level encryption algorithm.

Advantageously, in certain embodiments, the ticket-based authentication performed by the authentication module 124 can increase the security of the shared resources system 110. Instead of storing credentials and/or shared resource 130 connectivity information on the client systems 102 where this information can be hijacked, in certain embodiments a single-use ticket is stored at the client systems 102.

Additionally, in certain embodiments, the SSO features of the authentication module 124 can be used with any client system 102, including client systems 102 that are outside of the shared resources system's 110 domain. Thus, the SSO features described herein can be used in place of Kerberos-based authentication and similar such schemes when Kerberos authentication is not available. The SSO features described herein can also be used for client systems 102 that do not have Kerberos capability within the domain of the shared resources system 110.

Figure 2:
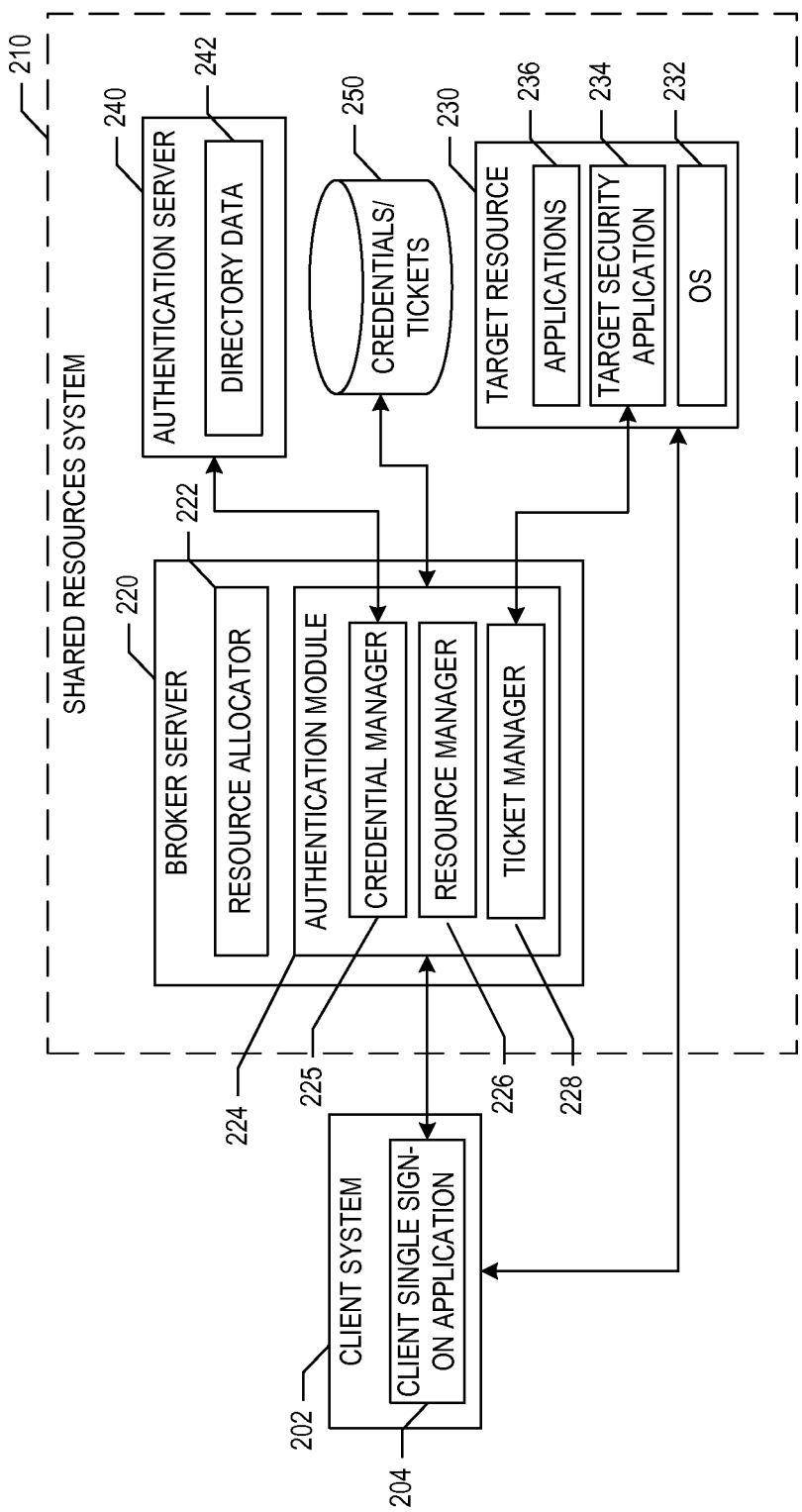
FIG. 2 illustrates a more detailed embodiment of the shared resources system of FIG. 1.

FIG. 2 illustrates a more detailed embodiment of the shared resources system 110, namely the shared resources system 210. The shared resources system 210 can include all the features of the shared resources system 110 described above. For instance, the shared resources system 210 includes a broker server 220, target shared resource 230, authentication server 240, and data store 250. These components can include all the functionality described above. Additionally, a client system 202 is shown connecting with the shared resources system 210. The client system 202 can have all the functionality described above with respect to the client system 102. For ease of illustration, the network 108 is not depicted in the embodiment shown. However, it should be understood that the client system 202 can communicate with the shared resources system 210 over a network such as the network 108.

In the depicted embodiment, the client system 202 includes a client SSO application 204. This application 204 can be implemented in the hardware of the client system 202. In one embodiment, the client SSO application 204 receives user credentials from a login user interface provided by the application 204 or by an operating system of the client system 202. The SSO application 204 can provide these credentials and other attributes to the broker server 220. In one embodiment, the client SSO application 204 provides a user interface for the user to enter credentials so as to access the broker server 220. In another embodiment, the user provides credentials when logging on to the client system 202 (e.g., through an operating system prompt). The client SSO application 204 obtains these credentials from an operating system service and passes the credentials to the broker server 220.

The broker server 220, like the broker server 120, includes a resource allocator 222 and an authentication module 224. In the depicted embodiment, the authentication module 224 is shown having three modules: a credential manager 225, a resource manager 226, and a ticket manager 228. In certain embodiments, the credential manager 225 receives the credentials from the application 204 of the client system 202. The credential manager 225 can store the credentials in a security cookie or the like. In addition to having its ordinary meaning, as used herein the term "security cookie" can represent contextual information that is maintained by a server. The contextual information maintained by the broker server 220 in the security cookie can include the user's credentials, among other things. In one embodiment, the credential manager 225 stores the security cookie in the data store 250 or in a memory.

The credential manager 225 can authenticate an identity of a user of the client system 202 with an authentication server 240 using the credentials. In one embodiment, the authentication server 240 is a MICROSOFT Active Directory server, such as a domain controller or the like. The authentication server 240 can also or instead include LDAP (Lightweight Directory Access Protocol) functionality. More generally, the authentication server 240 can be a directory server that stores directory data 242, including user credentials and other user information. In response to receiving an authentication request from the credential manager 225, the authentication server 240 can confirm to the credential manager 225 whether the user has valid credentials.

If the user has valid credentials, the resource manager 226 can select one or more shared resources that are available for access by the client system 202. The resource manager 226 can obtain information regarding which resources are available from the resource allocator 222. For example, the resource allocator 222 can apply a load balancing algorithm to determine which shared resources are available and can provide this availability information to the resource manager 226. The resource manager 226 can communicate to the client system 202 a list of one or more authorized resources that the client system 202 is permitted to access.

In response to receiving such a list, the client SSO application 204 can select a target resource (e.g., the target resource 230) to which the client system 202 would like to connect. The application 204 can communicate this request to the authentication module 224. The ticket manager 228 of the authentication module 224 can receive this request. The ticket manager 228 can create a ticket having a reference to the security cookie previously generated by the credential manager 225 in response to receiving the request. The ticket manager 228 can also store the ticket in the data repository 250 or in a memory. The ticket manager 228 can provide the ticket to the application 204 of the client system 202. This ticket can enable the application 204 of the client system 202 to authenticate to the target resource 230 without storing the user credentials and connection information on the client system 202.

The target resource 230 includes, in the depicted embodiment, an operating system 232 (such as a guest operating system), a target security application 234, and other applications 236. In response to receiving a ticket from the client SSO application 204, the target security application 234 can provide the ticket to the ticket manager 228 of the broker server 220. In response, in one embodiment, the ticket manager 228 provides the user credentials stored in the data repository 250 to the target security application 234.

The target resource 230 can include its own authentication mechanism, which may be provided by the operating system 232. The target security application 234 can provide the credentials to the authentication mechanism of the target resource 230 to authenticate the user. In another embodiment, the target security application 234 directly authenticates the user without using any services of the operating system 232. Once authenticated, the client system 202 can access the applications 236 of the target resource 230.

To enhance security, in certain embodiments the ticket manager 228 can destroy the ticket so that a subsequent access to the target resource 230 with the ticket does not successfully authenticate. The ticket manager 228 can destroy the ticket, for example, by deleting the ticket from the data repository 250.

III. Example Authentication Processes

Figure 3:
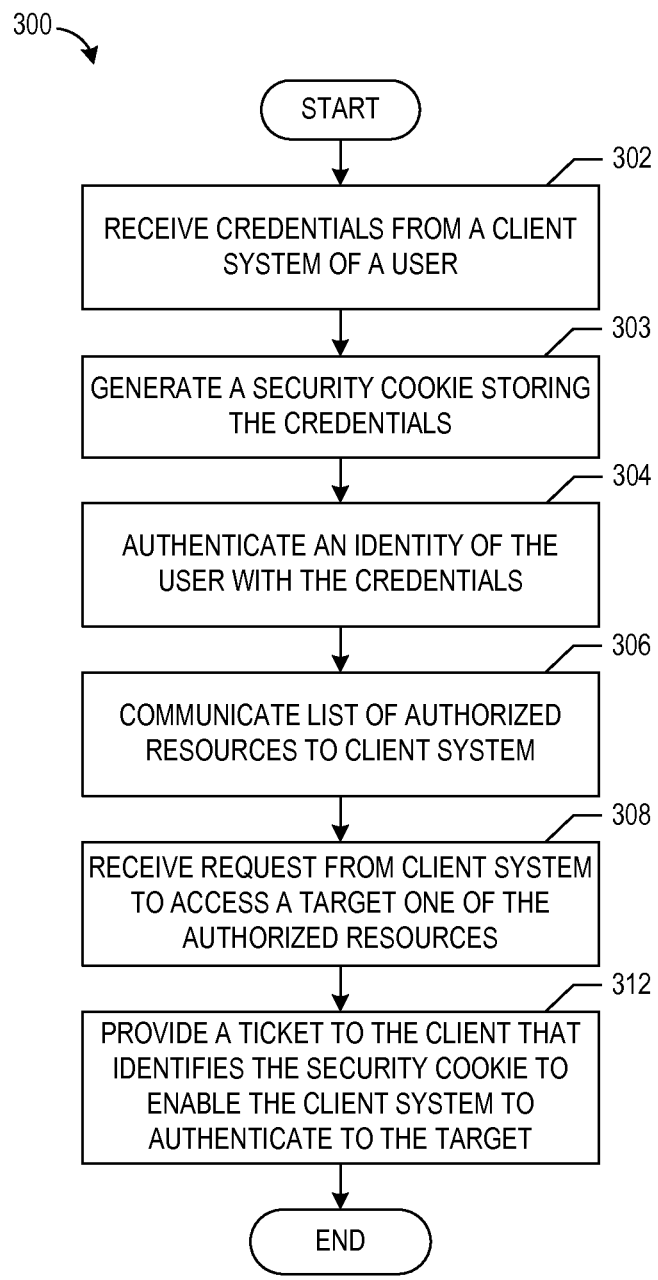
FIG. 3 illustrates an embodiment of a broker authentication process for providing single sign-on access in the shared resources system of FIG. 1 or 2.
Figure 4:
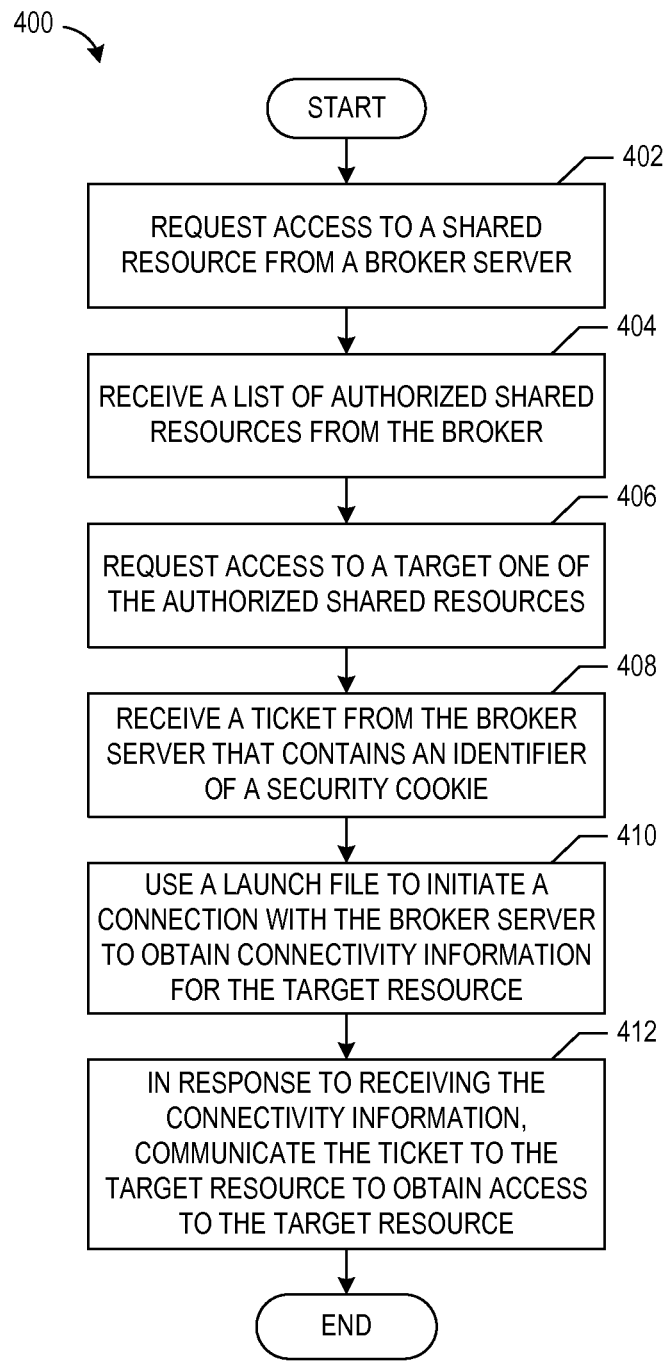
FIG. 4 illustrates an embodiment of a client authentication process for providing single sign-on access in the shared resources system.
Figure 5:
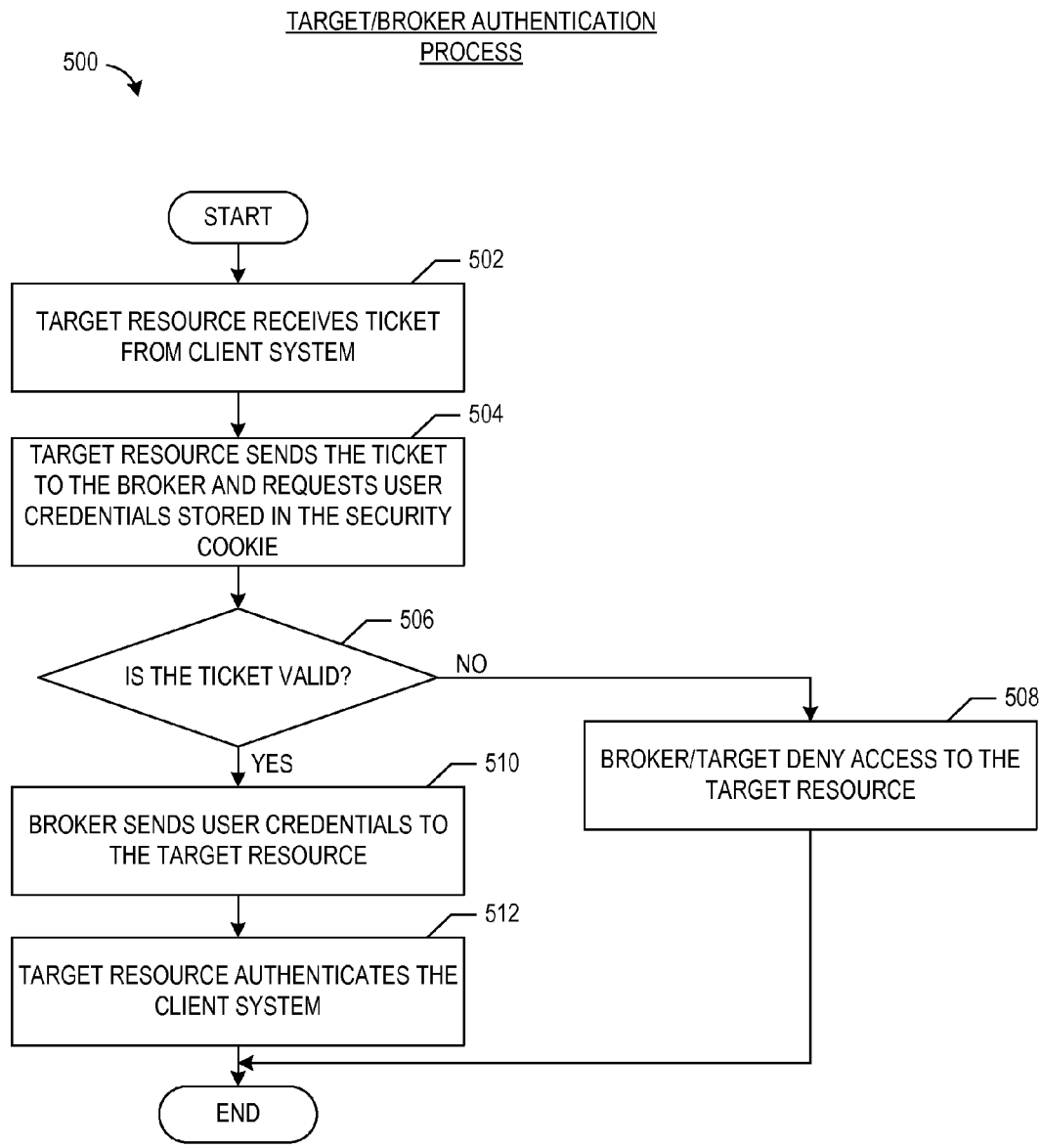
FIG. 5 illustrates an embodiment of a target resource and broker authentication process for providing single sign-on access in the shared resources system.
Figure 6:
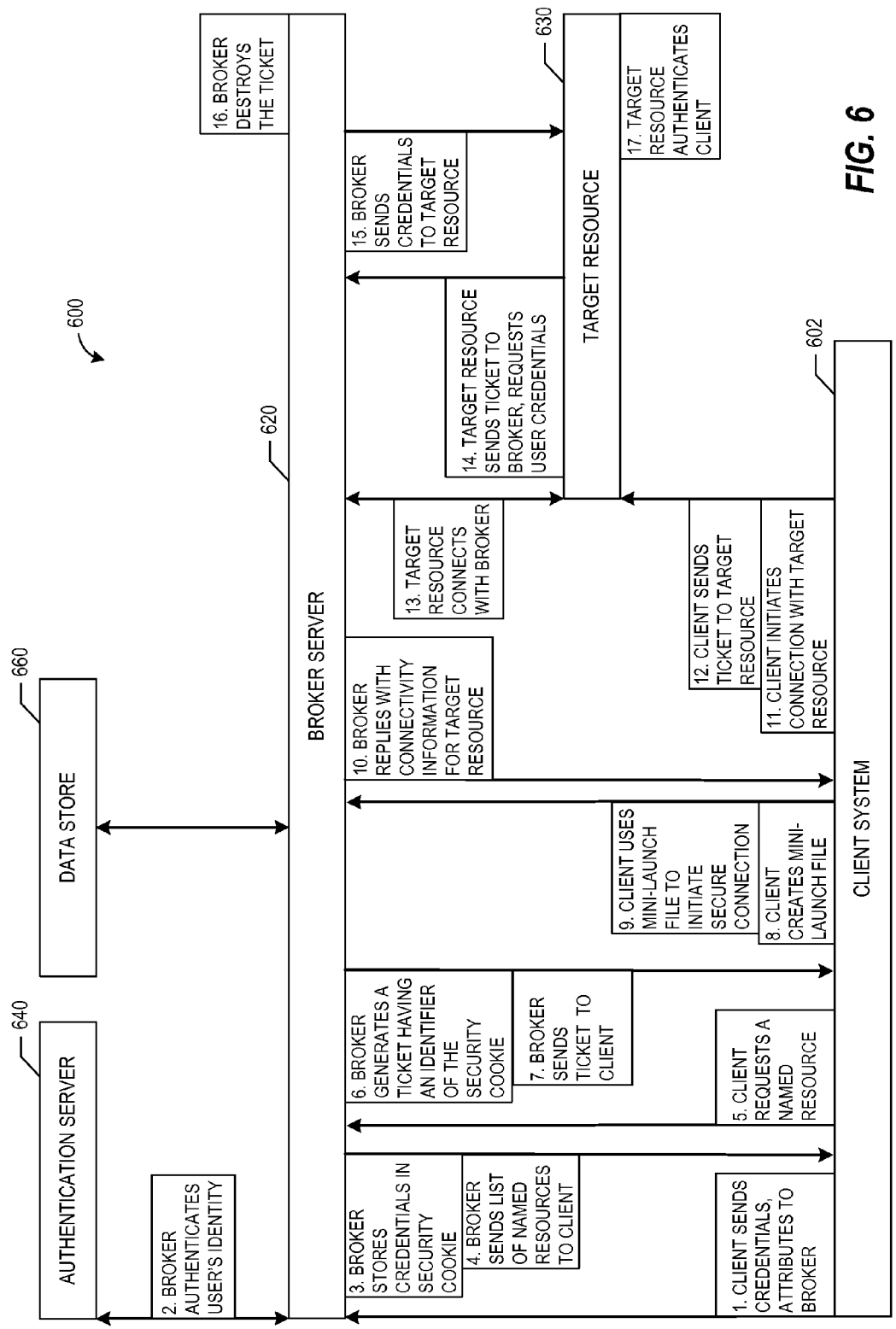
FIG. 6 illustrates a more detailed embodiment of a process for providing single sign-on access in the shared resources system.

Turning to FIGS. 3 through 6, various embodiments of authentication processes are illustrated. In particular, FIG. 3 illustrates an authentication process 300 from the perspective of a broker server, FIG. 4 illustrates an authentication process 400 from the perspective of a client system, and FIG. 5 illustrates an authentication process 500 primarily from the perspective of a target resource. FIG. 6 illustrates an overall authentication process 600 that illustrates how the processes 300, 400, and 500 can work together to provide more secure single sign-on.

Referring specifically to FIG. 3, an embodiment of a broker authentication process 300 is illustrated for providing single sign-on access to shared resources. The broker authentication process 300 can be implemented by the shared resources system 110 or 210. For example, the broker authentication process 300 can be implemented by the authentication module 124 or 224.

At block 302, credentials are received from a client system of a user. A security cookie is generated at block 303, which stores the credentials. An identity of the user is authenticated with the credentials at block 304, for example, with the authentication server 140 or 240. If the user identity is authenticated at block 304, a list of authorized resources is communicated to the client system at block 306. This list can be communicated to the client system by the resource manager 226.

At block 308, a request is received from the client system to access a target one of the authorized resources. In response, a ticket is provided to the client system at block 312. The ticket identifies the security cookie to the client system. For example, in one embodiment, the security cookie is assigned a global unique identifier by the broker system 120 or 220. The ticket can include this global unique identifier as a reference to identify the security cookie. This identification information can enable the client system to authenticate to the target resource.

FIG. 4 illustrates an embodiment of a client authentication process 400 for providing single sign-on access to shared resources. The client authentication process 400 can be implemented by the shared resources system 110 or 210. In particular, the client authentication process 400 can be accomplished by the client SSO application 204.

At block 402, access is requested to a shared resource from a broker server. The access request may or may not specify a particular shared resource. The access request can include a submission of credentials. A list of authorized shared resources is received from the broker at block 404, for example, if the broker authenticates the credentials as described above.

At block 406, access is further requested to a specific target one of the authorized shared resources. The client system can select this target from the list of named resources. A ticket is received from the broker at block 408. The ticket contains an authentication file identifier. This identifier can refer to a security cookie generated by the broker server (see FIG. 3).

A launch file is used to initiate a connection with the broker server at block 410 to obtain connectivity information for the target resource. The client system can create the launch file by storing the ticket in computer storage. The connection initiated with the broker server can be a secure connection in certain embodiments. At block 412, in response to receiving the connectivity information from the broker, the ticket is communicated to the target resource to obtain access to the target resource. In one embodiment, upon submitting the ticket, the client can receive access to the target resource. However, the target resource can perform additional authentication steps, as described below with respect to FIG. 5.

FIG. 5 illustrates an embodiment of a target resource/broker authentication process 500 for providing single sign-on access to shared resources. The authentication process 500 can be implemented by the shared resources system 110 or 210. In particular, the authentication process 500 can be accomplished by the target security application 234 and the ticket manager 228.

At block 502, a target resource receives a ticket (including, e.g., an authentication file identifier) from a client system. In response, at block 504, the target resource sends the ticket to the broker server and requests user credentials stored in the security cookie (see FIG. 3). It is determined at block 506 whether the ticket is valid. In one embodiment, the broker server can determine validity of the ticket by checking for a corresponding ticket in the data repository 150 or 250. In one embodiment, the target resource itself can perform this checking. Determining whether the ticket is valid can include determining whether the ticket is expired. A ticket can expire in certain embodiments due to a time limit being exceeded or due to the ticket being used previously to authenticate to a target resource.

If the ticket is not valid, the broker and/or target resource can deny access to the target resource at block 508. The client system therefore cannot access the target resource at block 508. Otherwise, the broker sends user credentials to the target resource at block 510. The target resource uses the credentials to authenticate the client system at block 512.

FIG. 6 illustrates a more detailed embodiment of an authentication process 600 for providing single sign-on access to shared resources. The authentication process 600 can be implemented by the shared resources system 110 or 210. In particular, the authentication process 600 is shown in the context of a client system 602, broker server 620, target resource 630, authentication server 640, and data store 660.

Each of these components can have all the functionality of the same components described above.

As illustrated, at state 1, the client system 602 sends credentials and optionally other attributes to the broker server 620. These attributes can include a variety of information, such as source IP address, client name, graphics information (e.g., to enable proper video processing by the target resource 630) and the like. This information can be used by the broker server 620 and/or the target resource 630 for a variety of purposes, including further qualifying the list of authorized resources delivered to the client system 602 and enabling proper rendering of icons and graphics on the client system's 602 display. Upon receiving the credentials and optionally other attributes, at state 2 the broker server 620 authenticates the user's identity. The broker server 620 can authenticate the user's identity with the authentication server 640, as described above.

At state 3, the broker server 620 stores the user's credentials in a security cookie, for example, in the data store 660 or in memory. At state 4, the broker server 620 sends a list of authorized named resources to the client system 602. The client system 602 requests one of the named resources (the target resource 630) at state 5. In response, the broker server 620 generates a ticket at state 6. The ticket can include an identifier of or reference to the security cookie. The ticket can be valid for one-time use and/or can expire after a set time period.

In some embodiments, the ticket can also include connectivity information for the broker server 620. This connectivity information can be useful, for example, in embodiments where multiple broker servers 620 are provided for failover purposes. This connectivity information can include a Uniform Resource Locator (URL) or Uniform Resource Indicator (URI), a server and port number, combinations of the same, or the like.

The broker server 620 sends the ticket to the client at state 7. At state 8, the client system 602 creates a mini-launch file that can include the ticket. Advantageously, in certain embodiments, the mini-launch file does not include any credentials or connectivity information, thereby improving security. It should be understood, however, that the client system 602 need not create a launch file in some implementations. Instead, the client system 602 can store the ticket in memory. An advantage to creating a mini-launch file over storing the ticket in memory in some systems (such as WINDOWS) is that separate processes can access the launch file without using cumbersome inter-process communication mechanisms.

At state 9, the client system 602 uses the mini-launch file to initiate a secure connection with the broker server 620. For example, the client system 602 can establish a connection with the broker at the specified URL. The broker server 620 replies with connectivity information for the target resource 630 at state 10. In one embodiment, the broker server 620 encrypts the connectivity information to reduce the likelihood of the connectivity information being compromised. The client system 602 does not persist this connectivity information on disk in certain implementations. The client system 602 initiates a connection with the target resource 630 at state 11 using this connectivity information. The client sends the ticket to the target resource 630 at state 12.

At state 13, the target resource 630 negotiates a secure connection with the broker server 620. Once connected, the target resource 630 sends the ticket to the broker server 620 at state 14, requesting the user's credentials. At state 15, the broker server 620 sends the credentials to the target resource 630. At state 16, the broker server 620 destroys the ticket. At state 17, the target resource 630 authenticates the client system 602.

IV. Additional Embodiments

Although the preceding description primarily describes authentication with user credentials, other authentication schemes are possible. In general, the client systems described above can authenticate to broker servers and/or target resources using any form of authentication information. Authentication information can include the credentials described above, Kerberos tickets, smart card data, one-time passwords, NT Lan Manager (NTLM) authentication information, encrypted credentials, security keys, combinations of the same, and the like.

For example, in one embodiment, a user of a client system can obtain a Kerberos ticket from a Kerberos key distribution server. The user can submit the Kerberos ticket to the broker server. The broker server can authenticate the user's identity with the authorization server using the Kerberos ticket. In response, the broker server can provide a ticket to the client system that includes connectivity information for accessing a target resource. The client system can obtain a second Kerberos ticket for the target resource. Then, the client can provide the Kerberos ticket and the broker-provided ticket to the target resource. Upon receiving the Kerberos ticket and the broker ticket, the target resource can authenticate the user. Thus, the systems and processes described above can be adapted to authenticate users with authentication information other than username and password credentials.

In another embodiment, the user uses a smart card (sometimes called a security token) to authenticate to the broker system. Typically, a user connects the smart card to an appropriate input device in communication with the client system. In the case of wireless smart cards, the user can bring the smart card into proximity with the input device. The user can then enter a personal identification number (PIN) into the client system, smart card, or input device. Software installed on the client system can then perform challenge-response authentication with the broker server.

For example, in one embodiment, the authentication information from the smart card, including optionally the PIN, can be stored in a security cookie. The broker server can use this security cookie in the manner detailed above to provide a ticket to the client system and ultimately to provide the authentication information to a target resource. In embodiments where the PIN is stored in the security cookie, the target resource may not request the user to re-enter the user's PIN. In other embodiments, the security cookie does not include the PIN, and the user is prompted to re-enter the PIN at the target resource.

In another embodiment, the broker server can perform deferred authentication for users having expired authentication information. A user with an expired password, for instance, can access the broker server. The broker server, upon determining from the authentication server that the password is expired, can force the user to change his or her password at the target resource. For example, the broker server can store the user's expired credentials in a security cookie and pass these expired credentials to the target resource. The target resource can then prompt the user to change his or her password. This pass-through authentication mechanism can be beneficial in situations where the target resource has built-in functionality for detecting expired passwords, changing passwords, and so forth. Code for this functionality would therefore not need to be implemented on the broker server in such embodiments.

Further, in some implementations, the broker server does not directly pass authentication information (such as credentials) to the target resource. Instead, the broker server can obtain an authentication token from a third party server, which the broker server (or the third party server) passes to the target resource. The target resource can then provide the client system with access to the target resource without performing its own authentication. In other words, the target resource can trust the broker server and/or third party server. The broker server and/or third party server can send the authentication token to the target resource before or after sending the list of authorized resources to the client system.

Many other variations than those described herein will be apparent from this disclosure.

V. Terminology

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of employing single sign-on in shared services environments, the method comprising:
   by a broker server system comprising computer hardware, performing pass-through authentication, the performing comprising:
      receiving credentials from a client system, the credentials corresponding to a user of the client system;
      attempting to authenticate, using the credentials, an identity of the user by communicating the credentials to an authentication server;
      receiving, from the authentication server, an indication that the credentials are expired;
      passing the expired credentials to a target resource to which the client system has requested access so as to cause the target resource to initiate a process for changing the expired credentials;
      generating, after the credentials have been changed, a ticket comprising a reference to the credentials; and
      providing the ticket to the client system, wherein the client system is enabled to provide the ticket to the target resource to obtain access to the target resource.

2. The method of claim 1, wherein the authentication server comprises an active directory server.

3. The method of claim 1, further comprising:
   providing, prior to establishing an authenticated connection with the client system, an authorized list of named resources.

4. A method of employing single sign-on in shared services environments, the method comprising:
   by a broker server comprising computer hardware:

receiving authentication information of a user from a client system;

authenticating, using the authentication information, an identity of the user by communicating the authentication information to an authentication server;

wherein if the broker server receives from the authentication server an indication that the authentication information includes expired credentials, the broker server causes the user to change the expired credentials at a particular resource to which the client system has requested access;

communicating to the client system a list of one or more authorized resources that the client system is permitted to access;

receiving a request from the client system to access a target resource from the one or more authorized resources;

generating a ticket comprising a reference to the authentication information;

providing the ticket to the client system, wherein the client system is enabled to provide the ticket to the target resource to obtain access to the target resource;

subsequent to the ticket being sent from the client system to the target resource, receiving the ticket from the target resource; and sending the authentication information to the target resource in response to receiving the ticket from the target resource, wherein the ticket enables the client system to authenticate to the target resource without storing user credentials and connection information on the client system.

5. The method of claim 4, wherein the ticket further comprises connection information for the target resource.

6. The method of claim 5, wherein the authentication information comprises one or more of the following: credentials, a Kerberos ticket, and NT Lan Manager (NTLM) authentication information.

7. The method of claim 6, wherein the credentials comprise a username, a password, and a domain name associated with the client system.

8. The method of claim 4, wherein the ticket is valid for a single use by the client system.

9. The method of claim 8, wherein the ticket authenticates with a single shared resource.

10. The method of claim 4, wherein the ticket is configured to expire beyond a specified time frame.

11. The method of claim 4, further comprising:
providing, prior to establishing an authenticated connection with the client system, an authorized list of named resources.

12. The method of claim 4, wherein the ticket comprises an authentication file identifier.

13. The method of claim 12, wherein the authentication file identifier comprises a reference to a security cookie generated by the broker server.

* * * * *